US008028193B2

(12) United States Patent
Dake et al.

(10) Patent No.: US 8,028,193 B2
(45) Date of Patent: *Sep. 27, 2011

(54) FAILOVER OF BLADE SERVERS IN A DATA CENTER

(75) Inventors: Gregory W. Dake, Durham, NC (US);
Eric R. Kern, Chapell Hill, NC (US);
Andrew B. McNeill, Jr., Cary, NC (US);
Martin J. Tross, Haifa (IL); Theodore B. Vojnovich, Cary, NC (US); Ben-Ami Yassour, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 420 days.

This patent is subject to a terminal disclaimer.

(21) Appl. No.: 11/956,128

(22) Filed: Dec. 13, 2007

(65) Prior Publication Data
US 2009/0158081 A1 Jun. 18, 2009

(51) Int. Cl.
*G06F 11/00* (2006.01)
(52) U.S. Cl. ........................................................ 714/13
(58) Field of Classification Search .................... 714/13
See application file for complete search history.

(56) References Cited

U.S. PATENT DOCUMENTS

| 6,715,098 B2 * | 3/2004 | Chen et al. .................... 714/3 |
| 7,610,509 B2 * | 10/2009 | Abe ............................... 714/11 |
| 2002/0133746 A1 * | 9/2002 | Chen et al. ....................... 714/13 |
| 2005/0246568 A1 | 11/2005 | Davies |
| 2006/0150003 A1 * | 7/2006 | Abe ............................... 714/11 |
| 2009/0077370 A1 * | 3/2009 | Barabash et al. ............. 713/100 |
| 2009/0158081 A1 * | 6/2009 | Dake et al. ....................... 714/3 |

OTHER PUBLICATIONS

Kern, et al.; BladeCenter Open Fabric Manager; e server; Sep. 14, 2007; pp. 1-90; xSeries Lab Services; IBM.

* cited by examiner

*Primary Examiner* — Philip Guyton
*Assistant Examiner* — Amine Riad
(74) *Attorney, Agent, or Firm* — Brandy C. Kennedy; Cynthia G. Seal; Biggers & Ohanian, LLP (57) ABSTRACT

Failover of blade servers in a data center including powering off a failing blade server by a system management server through a blade server management module ('BSMM') managing the failing blade server, the failing blade server characterized by a machine type, one or more network addresses, and one or more storage addresses, the addresses being virtual addresses; identifying, by the system management server from a pool of standby blade servers, a replacement blade server, the replacement blade server managed by a BSMM; assigning, by the system management server through the BSMM managing the replacement blade server, the one or more network addresses and the one or more storage addresses of the failing blade server to the replacement blade server, including enabling in the replacement blade server the assigned addresses; and powering on the replacement blade server by the system management server through the BSMM managing the replacement blade server.

18 Claims, 4 Drawing Sheets

FAILOVER OF BLADE SERVERS IN A DATA CENTER

BACKGROUND OF THE INVENTION

1. Field of the Invention

The field of the invention is data processing, or, more specifically, methods, apparatus, and products for failover of blade servers in a data center.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Blade computers are increasingly being used to run critical applications that require a high level of redundancy and fault tolerance. Various clustering solutions exist such as VMware's high availability and Microsoft's clustering technology, but these systems are often complex and high priced. To provide redundancy and fault tolerance, data used by blade computers is stored remotely with respect to the blade. The remote storage is typically administered through a third party proxy by use of storage and network addresses of blade servers. Such storage and network addresses include for example, WWN or MAC address. A World Wide Name ('WWN') or World Wide Identifier ('WWID') is a unique identifier in a Fibre Channel or Serial Attached SCSI storage network, and a Media Access Control address ('MAC address'), Ethernet Hardware Address ('EHA'), hardware address, or adapter address is a quasi-unique identifier attached to most network adapters in blade computers. When a blade computer fails and is replaced, however, a manual and complex process is required to replace the failed blade with a new blade so that the new blade is capable of accessing the same remote storage. There is currently no automatic process for replacing a failed blade computer having remote storage with another blade computer that does not require the use of the remote third party proxy that manages the remote storage.

SUMMARY OF THE INVENTION

Methods, apparatus, and products for failover of blade servers in a data center are disclosed that include powering off a failing blade server by a system management server through a blade server management module ('BSMM') managing the failing blade server, the failing blade server characterized by a machine type, one or more network addresses, and one or more storage addresses, the addresses being virtual addresses; identifying, by the system management server from a pool of standby blade servers, a replacement blade server, the replacement blade server managed by a BSMM; assigning, by the system management server through the BSMM managing the replacement blade server, the one or more network addresses and the one or more storage addresses of the failing blade server to the replacement blade server, including enabling in the replacement blade server the assigned addresses; and powering on the replacement blade server by the system management server through the BSMM managing the replacement blade server.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
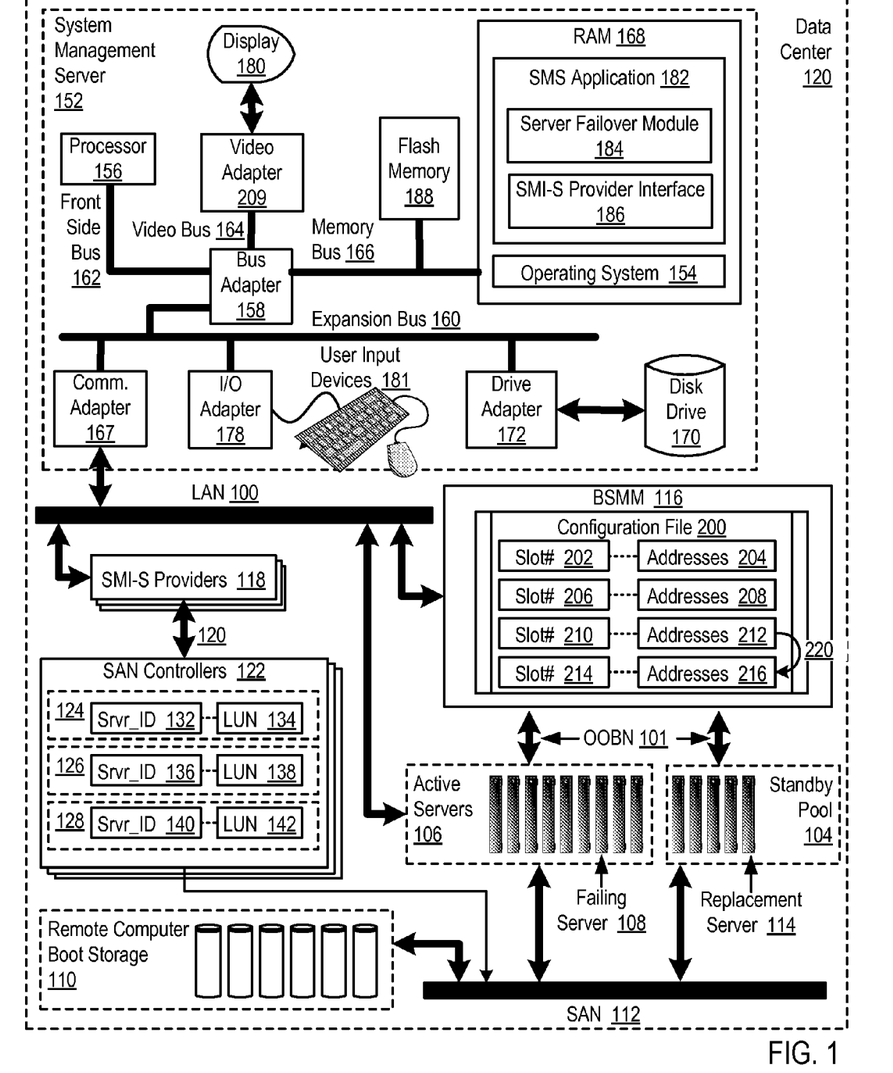
FIG. 1 sets forth a functional block diagram of an exemplary system implementing failover of blade servers in a data center according to embodiments of the present invention.

Exemplary methods, apparatus, and products for failover of blade servers in a data center in accordance with the present invention are described with reference to the accompanying drawings, beginning with FIG. 1. FIG. 1 sets forth a functional block diagram of an exemplary system implementing failover of blade servers (106) in a data center (120) according to embodiments of the present invention. The data center (120) is a facility used to house mission critical computer systems and associated components. Such a data center includes environmental controls (air conditioning, fire suppression, etc.), redundant/backup power supplies, redundant data communications connections, and high security, highlighted by biometric access controls to compartmentalized security zones within the facility. A data center is a facility used for housing a large amount of electronic equipment, typically computers and communications equipment. A data center is maintained by an organization for the purpose of handling the data necessary for its operations. A bank, for example, may have a data center, where all its customers' account information is maintained and transactions involving these accounts are carried out. Practically every company that is mid-sized or larger has some kind of data center with the larger companies often having dozens of data centers.

A server, as the term is used in this specification, refers generally to a multi-user computer that provides a service (e.g. database access, file transfer, remote access) or resources (e.g. file space) over a network connection. The term 'server,' as context requires, refers inclusively to the server's computer hardware as well as any server application software or operating system software running on the server. A server application is an application program that accepts connections in order to service requests from users by sending back responses. A server application can run on the same computer as the client application using it, or a server application can accept connections through a computer network. Examples of server applications include file server, database server, backup server, print server, mail server, web server, FTP servers, application servers, VPN servers, DHCP servers, DNS servers, WINS servers, logon servers, security servers, domain controllers, backup domain controllers, proxy servers, firewalls, and so on.

Blade servers are self-contained servers, designed for high density. A blade enclosure provides services such as power, cooling, networking, various interconnects and management—though different blade providers have differing principles around what should and should not be included in the blade itself—and sometimes in the enclosure altogether. Together, a set of blade servers installed in a blade enclosure or 'blade center' for a blade system. As a practical matter, all computers are implemented with electrical components requiring power that produces heat. Components such as processors, memory, hard drives, power supplies, storage and network connections, keyboards, video components, a mouse, and so on, merely support the basic computing function, yet they all add bulk, heat, complexity, and moving parts that are more prone to failure than solid-state components. In the blade paradigm, most of these functions are removed from the blade computer, being either provided by the blade enclosure (DC power) virtualized (iSCSI storage, remote console over IP), or discarded entirely (serial ports). The blade itself becomes simpler, smaller, and amenable to dense installation with many blade servers in a single blade enclosure.

The example system of FIG. 1 includes a number of servers, active blade servers (106), a pool (104) of available standby blade servers, and a system management server (152). An active blade server (106) is a blade server presently in use to provide responses to user requests for data processing services from the data center (120). The example system of FIG. 1 also includes a pool (104) of available standby blade servers. A standby blade server is a blade server that is not presently in use to provide responses to user requests for data processing services from the data center (120) but is available to be brought into active service upon failure of an active blade computer.

The example system of FIG. 1 includes a blade server management module (116), an aggregation of computer hardware and software that is installed in a blade enclosure or blade center to provide support services for blade servers in the blade enclosure. Support services provided by the blade server management module (116) include monitoring health of blade servers and reporting health statistics to a system management server, power management and power control, save and restore configurations, discovery of available blade servers, event log management, memory management, and so on. An example of a blade server management module that can be used in systems that failover blade servers according to embodiments of the present invention is IBM's Advanced Management Module ('AMM'). The blade server management module (116) in this example communicates with a system management server (152) through a local area network ('LAN') (100), and the blade server management module (116) communicates with the blade servers (106, 104) through an out-of-band network (101). The LAN may be implemented as an Ethernet, an IP (Internet Protocol) network, or the like, and the out-of-band network (101) may be implemented as an Inter-Integrated Circuit ('I²C') bus, a System Management Bus ('SMBus'), an Intelligent Platform Management Bus ('IPMB'), or the like.

Each blade server (104, 106) in this example may optionally be mapped to remote computer boot storage (110) through a storage area network ('SAN') (112). The boot storage (110) is 'remote' in the sense that all the system-level software, such as a kernel and other operating system software, that is needed to operate each server is stored, not on the server itself, but remotely from the server across a storage area network ('SAN') (112) on storage exposed to the blade servers through the SAN. The only boot-related software on the blade servers is a thin piece of system-level firmware required to initiate a boot from remote storage.

The SAN (112) is a network architecture that attaches remote computer storage devices such as disk arrays, for example, to blade servers so that, to the blade server's operating system, the remote storage devices appear as locally attached disk drives. That is, the remote boot storage (110) that can be mapped to the blade servers in this example is exposed by the SAN (112) to each server (104, 106) as a separate virtual drive. Such virtual drives are often referred to or referenced by a so-called logical unit number or 'LUN.' A LUN is an address for an individual disk drive and by extension, the disk device itself. A LUN, or the remote storage identified by a LUN, is normally not an entire disk drive but rather a virtual partition (or volume) of a RAID set—in this example a virtual disk drive that organized a portion of RAID (Redundant Array of Inexpensive Drives) storage and presents it to an operating system on a server as an actual disk drive. Most SANs use the SCSI protocol for communication between servers and disk drive devices, though they do not use its low-level physical interface, instead using a mapping layer. The mapping layer may be implemented, for example, with Fibre Channel (Fibre Channel Protocol or 'FCP' is Fibre Channel's SCSI interface), iSCSI (mapping SCSI over TCP/IP), HyperSCSI (mapping SCSI over Ethernet), Advanced Technology Attachment ('ATA') over Ethernet, and Infini-Band (supports mapping SCSI over InfiniBand and/or mapping TCP/IP over InfiniBand).

The example system of FIG. 1 also includes one or more SAN controllers (122). Each SAN controller (122) is a module of computer hardware and software that organizes physical disk storage into virtual drives to be exposed to blade servers (104, 106) through the SAN (112). Each SAN controller maintains mappings of blade servers to remote computer boot storage in the form of two-element data structures (124, 126, 128) known as storage groups. Each storage group associates a blade server identifier (132, 136, 140) and an identifier of a particular instance of remote computer boot storage (134, 138, 142). The blade server identifier (132, 136, 140) may be implemented as a storage address. A storage address as the term is used in this specification is an address used in connecting a blade server to remote storage. Storage addresses may be any data coding that uniquely identifies each blade server having mapped remote computer boot storage, such as, for example, a network adapter number for an adapter that connects a blade server to the SAN, a port identifier of a data communications port that connects a blade server to the SAN, a combination of an adapter number and a port identifier, a World Wide Name ('WWN'), a Media Access Control ('MAC') address, and so on. The identifiers of remote computer boot storage (134, 138, 142) in this example are implemented as LUNs. For ease of explanation, only three storage groups (124, 126, 128) are illustrated here. Readers will recognize, however, that practical systems may include many storage groups, typically, for example, one or more storage groups for each active blade server.

The SAN controllers (122) are connected to the system management server (152) in this example through one or more SMI-S providers (118). 'SMI-S' stands for the Storage Management Initiative-Specification, a storage standard developed and maintained by the Storage Networking Industry Association ('SNIA'). SMI-S has also been ratified as ANSI standard ANSI INCITS 388-2004. SMI-S is based upon the Common Information Model and the Web-Based Enterprise Management standards defined by the Distributed Management Task Force. Each SMI-S provider (118) is a module of computer hardware and software that 'provides' to the system management server a standardized interface for control of a SAN (112) through a SAN controller (122). The control interface (120) exposed directly by the SAN controllers (122) is a proprietary interface unique to each make and model of SAN controller. The SMI-S controllers help avoid the need to program each system management server differently for each type of SAN controller in a system. By use of SMI-S providers, a system administrator can use any number of different makes and models of SAN controllers in a SAN and still need only a single control interface to control all the entire SAN. In this example, the SMI-S control interface is represented in the software in the system management controller as the SMI-S provider interface (186).

The system of FIG. 1 includes an exemplary system management server (152) useful in failover of blade servers in a data center according to embodiments of the present invention. The system management server (152) is a server of the data center (120) that automates many of the processes that are required to proactively manage servers in the data center, including capacity planning, asset tracking, preventive maintenance, diagnostic monitoring, troubleshooting, firmware updates, blade server failover, and so on. The system management server (152) of FIG. 1 includes at least one computer processor (156) or 'CPU' as well as random access memory (168) ('RAM') which is connected through a high speed memory bus (166) and bus adapter (158) to processor (156) and to other components of the system management server (152).

Stored in RAM (168) is a system management server application program (182), a set of computer program instructions that operate the system management server so as to automatically under program control carry out processes required to manage servers in the data center, including capacity planning, asset tracking, preventive maintenance, diagnostic monitoring, troubleshooting, firmware updates, blade server failover, and so on. An example of a system management server application program (182) that can be improved to failover blade servers in a data center according to embodiments of the present invention is IBM's 'Director.'

Also stored in RAM (168) is a server failover module (184), a module of computer program instructions for automatic administration of blade server failover. The transfer of operation from a failing active blade server (108) to an available standby blade server (114) so as to ensure uninterrupted data flow, operability, and data processing services for users of the data center is referred to in this specification as 'failover.' Failover is the automated substitution of a functionally equivalent standby blade server for a failing active blade server. Failures that lead to failover can include a loss of power to an active blade server, a memory fault in an active blade server, a processor defect in an active blade server, loss of network connectivity for an active blade server, and so on. The data center (120) in this example provides automated failover from a failing active blade server to a standby blade server through the server failover module (184) of the system management server (152). An example of a server failover module that can be improved for failover of blade servers in a data center according to embodiments of the present invention is IBM's 'Boot From SAN Blade Failover Extension for IBM Director.'

Also stored in RAM (168) is an operating system (154). Operating systems useful for failover of blade servers in a data center according to embodiments of the present invention include UNIX™, Linux™, Microsoft XP™, AIX™, IBM's i5/OS™, and others as will occur to those of skill in the art. The operating system (154), the system management server application (182), the server failover module (184), and the SMI-S provider interface (186) in the example of FIG. 1 are shown in RAM (168), but many components of such software typically are stored in non-volatile memory also, such as, for example, on a disk drive (170) or in flash memory (188).

The system management server (152) of FIG. 1 includes disk drive adapter (172) coupled through expansion bus (160) and bus adapter (158) to processor (156) and other components of the system management server (152). Disk drive adapter (172) connects non-volatile data storage to the system management server (152) in the form of disk drive (170). Disk drive adapters useful in system management servers for failover of blade servers in a data center according to embodiments of the present invention include Integrated Drive Electronics ('IDE') adapters, Small Computer System Interface ('SCSI') adapters, and others as will occur to those of skill in the art. Non-volatile computer memory also may be implemented as an optical disk drive, electrically erasable programmable read-only memory (so-called 'EEPROM' or 'Flash' memory) (188), RAM drives, and so on, as will occur to those of skill in the art.

The example system management server (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example system management server (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary system management server (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for failover of blade servers in a data center according to embodiments of the present invention include modems for wired dial-up communications, Ethernet (IEEE 802.3) adapters for wired data communications network communications, and 802.11 adapters for wireless data communications network communications.

The example system management server of FIG. 1 operates generally to failover blade servers in a data center according to embodiments of the present invention by powering off a failing blade server (108) and identifying a replacement blade server (114). The failing blade server is managed by a BSMM (116) and is characterized by a machine type, one or more network addresses, and one or more storage addresses, the addresses being virtual addresses.

A network address as the term is used in the specification refers to any data coding that uniquely or quasi-uniquely identifies a network adapter when the address is used in data communications networks. Examples of network addresses include MAC addresses, Ethernet Hardware Addresses, hardware addresses, adapter addresses, and so one as will occur to those of skill in the art. Network addresses may be used in data communications networks for many reasons including, for example, routing data communications traffic to particular destination devices. Network addresses are typically provided by the manufacturer of the network adapter and are typically never modified. In this way, the manufacturer-provided network adapters are almost always globally unique.

A storage address as the term is used in the specification refers to any data coding that uniquely or quasi-uniquely identifies a network adapter when the address is used in connecting blade servers to data storage. Examples of storage addresses include a network adapter number for an adapter that connects a blade server to the SAN, a port identifier of a data communications port that connects a blade server to the SAN, a combination of an adapter number and a port identifier, a WWN, a WWID, a World Wide Node Name ('WWNN'), a World Wide Port Name ('WWPN'), and so on. Just as network addresses are manufacturer-provided so also are storage addresses typically manufacturer provided and typically never modified.

A virtual address is a network or storage address that is assigned to a blade server, or more specifically a blade server's network adapter, by a system management server, not a manufacturer of the network adapter or blade server. That is, virtual addresses appear to existing systems as any typical network or storage address, but are actually different than the original, manufacturer-provided network or storage addresses of the blade server.

A data center according to embodiments of the present invention may include one or more virtual address domains. A virtual address domain is a set of virtual addresses available for assignment to a set blade servers. A virtual address domain may, for example, include a set of virtual addresses available for assignment to all blades in a particular chassis. Two different virtual address domains may contain the same virtual addresses. In this way, a virtual address is not globally unique in contrast to most typical network or storage addresses.

From time to time blade servers in a data center may malfunction and fail for many reasons, such as overheating in the data center, overheating in the blade server, a software failure in the blade server, hardware failure in the blade server, and the like. When a blade server fails the BSMM monitoring the health of the blade server identifies the failure and sends an event notification to the system management server (152). Such an event notification typically includes a slot number of the failing blade server. The physical location in which a blade server is installed in a chassis is referred to as a slot. Each slot is represented by a slot number. The slot number of the failing blade server represents the physical location of the failing blade server in a chassis in the data center (120).

The system management server may power off a failing blade server (108) by a call to the BSMM (116). Such a call to the BSMM may include an identification of the blade server by the server's slot number. System management servers and BSMMs identify devices in the data center, server-specific settings, and data connections associated with a particular blade server by the slot number in which the blade server is installed. That is, a slot number of the blade server represents, for most purposes, the blade server itself. As described below in detail, for example, a BSMM includes a configuration file associating slot numbers of the blade servers managed by the BSMM and the network and storage addresses of the blade servers.

As mentioned above the failing blade server is managed by a BSMM (116). The replacement blade server (114) is also managed by a BSMM. In some data centers useful for failover of blade servers in accordance with embodiments of the present invention the replacement blade server may be managed by a different BSMM than the BSMM managing the failing blade server. For clarity in the example data center (120) of FIG. 1, however, the failing blade server (108) and the replacement blade server (114) are both managed by the same BSMM (116).

The system management server (152) identifies, from a pool (104) of standby blade servers, a replacement blade server (114) by finding a replacement blade server that is powered off and is of the same machine type as the failing blade server. The system management server includes a list of replacement blade servers which associates slot numbers of the blade servers with machine type. The system management server scans this list to identify a blade server in a slot having the same machine type, then querying a BSMM managing the blade server to determine whether the BSMM is powered off. In identifying the replacement blade server, therefore, the system management server (152) also identifies a slot number of the replacement blade server.

Having identified a replacement blade server, and the blade server's slot number, the system management server then assigns the one or more network addresses and the one or more storage addresses of the failing blade server (108) to the replacement blade server (114), including enabling in the replacement blade server (114) the assigned addresses. In assigning the addresses to the replacement blade server, the system management server (152) may associate in a configuration file (200) of the BSMM (116) managing the replacement blade server (114) a slot number (256) of the replacement blade server (114) with the one or more network addresses and the one or more storage addresses of the failing blade server (108).

Assume for purposes of explanation that the addresses (212) associated with the slot number (210) are addresses of the failing blade server (108) and the addresses (216) associated with slot number (214) are addresses of the replacement blade server. Assigning the addresses of the failing blade server to the replacement blade server may include assigning (220) the addresses (212) associated with the slot number (210) as the addresses (216) associated with slot number (214), effectively replacing the replacement blade server's addresses with the failing blade server's addresses.

After the assignment, the replacement blade server having never been physically moved from slot number (214) appears to other devices in the data center (120), SAN controllers and other blade servers (106) for example, as the failing blade server which is actually installed in slot number (210). In this way, no change in the server identifications (132, 136, 140) of the storage groups (124, 126, 128) is necessary nor is any change in data communications routing carried out in the LAN (100) necessary. After the assignment, the replacement blade server, and the entire data center in fact, acts as if the replacement blade server is the failing blade server, with no change required to any third party proxy settings.

As mentioned above, assigning the addresses of the failing blade server to the replacement blade server also includes enabling in the replacement blade server (114) the assigned addresses. The system management server (152) enables in the replacement blade server (114) the assigned addresses by setting in non-volatile memory of the replacement blade server the assigned addresses as the blade server's addresses instead of the blade server's manufacturer-provided addresses. Basic input/output system ('BIOS') modules of blade servers are typically capable of identifying and exposing the manufacturer-provided addresses of the blade server's network adapters. If the virtual addresses are assigned in the configuration of the BSMM but not enabled in the blade server itself, address overlap as well as address conflict may occur. The BIOS modules of each blade server according to embodiments of the present invention are improved in that the modules are capable of identifying a virtual address in non-volatile memory and using the virtual address instead of the original manufacturer-provided address.

Enabling the addresses in the replacement blade server may also include setting on or more of the virtual addresses in non-volatile memory of network adapters physically remote with respect to the blade server itself but connecting the blade server to various data communications and storage networks. In some blade center chassis, for example, particular network adapters such as Ethernet or Fibre Channel adapters are built into the chassis and are hardwired to be connected to particular slots. The BIOS modules of each of the cards are also capable of identifying the virtual addresses in non-volatile memory and using the virtual address instead of the original manufacturer-provided address.

The network and storage addresses of a blade server are typically manufacturer-provided and are typically not modified by any other user. Such addresses are designed to be globally unique when provided by the manufacturer. Because these addresses are globally unique when provided by the manufacturer and the present invention replaces the manufacturer-provided addresses with virtual address only unique within a defined range of addresses, there is a possibility that the virtual addresses and global addresses of other blade servers will overlap if a blade server having virtual addresses is installed in an environment with blade servers not having virtual addresses. Overlapping storage or network addresses will typically cause various catastrophic data communications and storage network failures. For this reason, when a virtual address is assigned and enabled in a blade server, the blade server's original addresses are stored. That is, assigning (242) the one or more network addresses (236) and the one or more storage addresses (238) of the failing blade server (108) to the replacement blade server (114) may include storing the failing blade server's original addresses. If removed from a blade server's current virtual address domain, the original addresses are restored such that the blade server's addresses are again globally unique, manufacture-provided addresses.

Having assigned the addresses of the failing blade server to the addresses of the replacement blade server, the system management server then powers on the replacement blade server. The system management server (152) may power on the replacement blade server by a call to the blade server management module (116), the call identifying a slot number of the replacement blade server.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art.

Various embodiments of the present invention may be implemented on a variety of hardware platforms in addition to those illustrated in FIG. 1.

Figure 2:
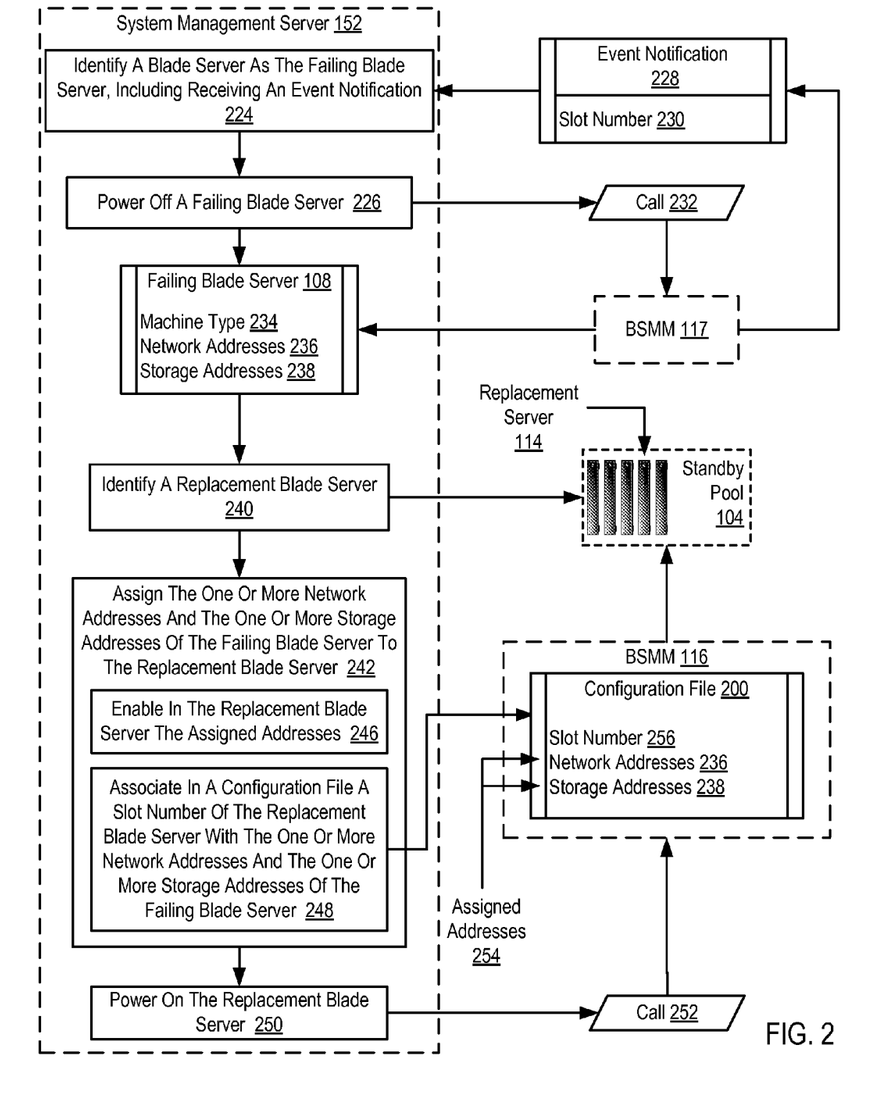
FIG. 2 sets forth a flow chart illustrating an exemplary method for failover of blade servers in a data center according to embodiments of the present invention.

For further explanation, FIG. 2 sets forth a flow chart illustrating an exemplary method for failover of blade servers in a data center according to embodiments of the present invention. The method of FIG. 2 includes identifying (224) a blade server as a failing blade server (108). In the method of FIG. 2, identifying (224) a blade server as a failing blade server (108) is carried out by receiving from a BSMM (117) managing the failing blade server (108) an event notification (228). The event notification (228) identifies a slot number (230) of the failing blade server (108).

The method of FIG. 2 also includes powering off (226) the failing blade server (108) by a system management server (152) through a blade server management module ('BSMM') (117) managing the failing blade server (108). The failing blade server (108) is characterized by a machine type (234), one or more network addresses (236), and one or more storage addresses (238). The failing blade servers' addresses (234,236) in the example of FIG. 2 are virtual addresses. As mention above, powering off the failing blade server may be carried out by a call the BSMM (117) identifying the slot number of the failing blade server (108).

The method of FIG. 2 also includes identifying (240), by the system management server (152) from a pool (104) of standby blade servers, a replacement blade server (114). In the example of FIG. 2 the replacement blade server (114) is managed by a BSMM (116). In this example the BSMM (116) managing the replacement blade server (114) is different than the BSMM (117) managing the failing blade server. These BSMMs may be installed in the same chassis or in separate chassis.

The method of FIG. 2 also includes assigning (242), by the system management server (152) through the BSMM (116) managing the replacement blade server (114), the one or more network addresses (236) and the one or more storage addresses (238) of the failing blade server (108) to the replacement blade server (114), including enabling (246) in the replacement blade server (114) the assigned addresses (254). In the method of FIG. 2 assigning (242) the one or more network addresses (236) and the one or more storage addresses (238) of the failing blade server (108) to the replacement blade server (114) includes associating (248) in a configuration file (200) of the BSMM (116) managing the replacement blade server (114) a slot number (256) of the replacement blade server (114) with the one or more network addresses (236) and the one or more storage addresses (238) of the failing blade server.

The method of FIG. 2 also includes powering on (250) the replacement blade server (114) by the system management server (152) through the BSMM (116) managing the replacement blade server (114). As mentioned above, powering on (250) the replacement blade server (114) by the system management server (152) may be carried out with a call to the BSMM (116) managing the replacement blade server (114), the call including the slot number of the replacement blade server.

Figure 3:
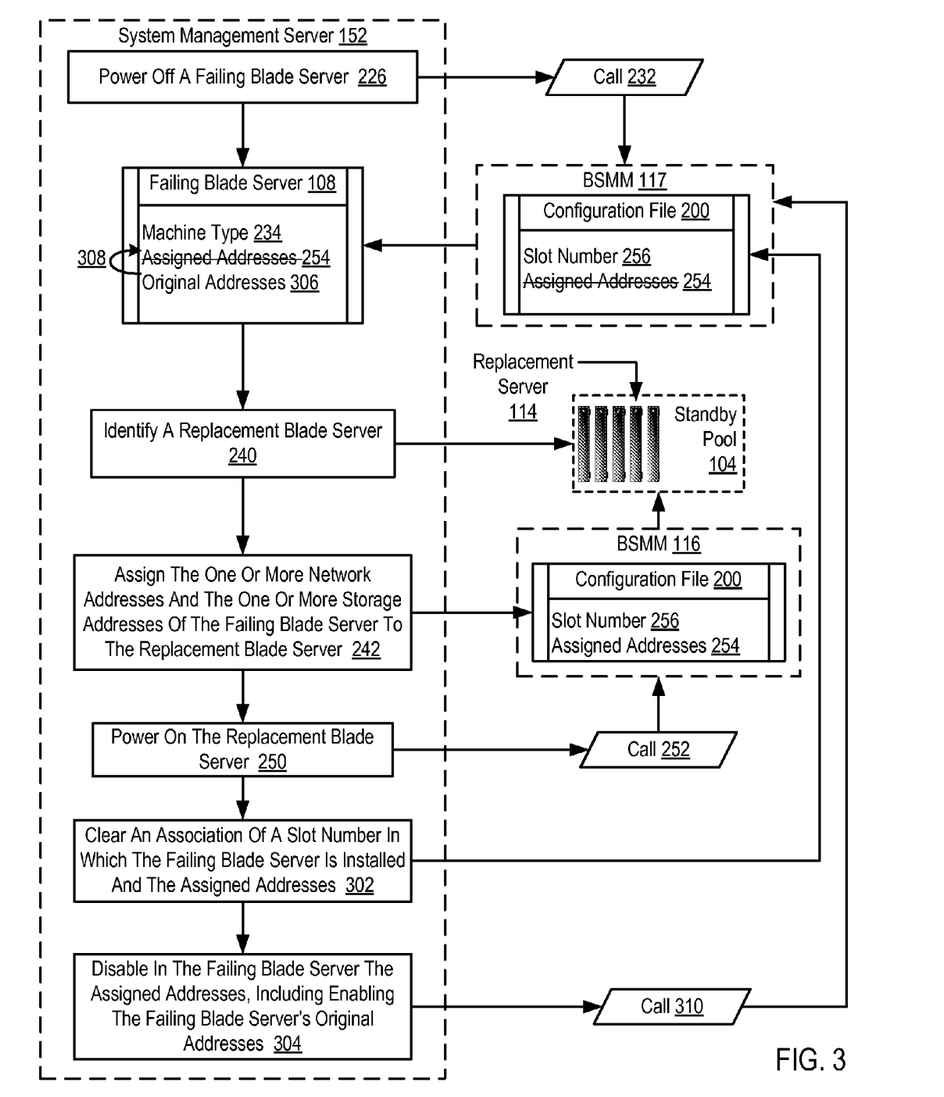
FIG. 3 sets forth a flow chart illustrating a further exemplary method for failover of blade servers in a data center according to embodiments of the present invention.

For further explanation, FIG. 3 sets forth a flow chart illustrating a further exemplary method for failover of blade servers in a data center according to embodiments of the present invention. The method of FIG. 3 is similar to the method of FIG. 2, including as it does the system management server's (152) powering off (226) a failing blade server (108); identifying (240) a replacement blade server (114); assigning (242) the one or more network addresses (236) and the one or more storage addresses (238) of the failing blade server (108) to the replacement blade server (114), including enabling (246) in the replacement blade server (114) the assigned addresses (254); and powering on (250) the replacement blade server (114) by the system management server (152) through the BSMM (116) managing the replacement blade server (114).

The method of FIG. 3 differs from the method of FIG. 2, however, in that the method of FIG. 3 also includes clearing (302), by the system management server (152) from the BSMM (117) managing the failing blade server (108), an association of a slot number (256) in which the failing blade server (108) is installed and the assigned addresses (254). If the addresses associated with the slot number of the failing blade server are not cleared, the addresses will overlap and conflict with the assigned addresses associated with the replacement blade server's slot number.

The method of FIG. 3 also differs from the method of FIG. 2, in that the method of FIG. 3 also includes disabling (304) in the failing blade server (108) the assigned addresses (254). In the method of FIG. 3 disabling (304) in the failing blade server (108) the assigned addresses (254) may be carried out by enabling (308) the failing blade server's (108) original addresses (306). As mentioned above, when assigning virtual addresses to a blade server, the system management server may also store the blade server's original manufacturer-provided addresses for later restoration. In the example of FIG. 3, those manufacturer-provided addresses are restored in a failing blade server such that the failing blade server, if repaired, may be installed and used in a new environment, including another virtual address domain, a non-virtual address environment, or even another data center, without causing an overlap of addresses in the new environment.

Figure 4:
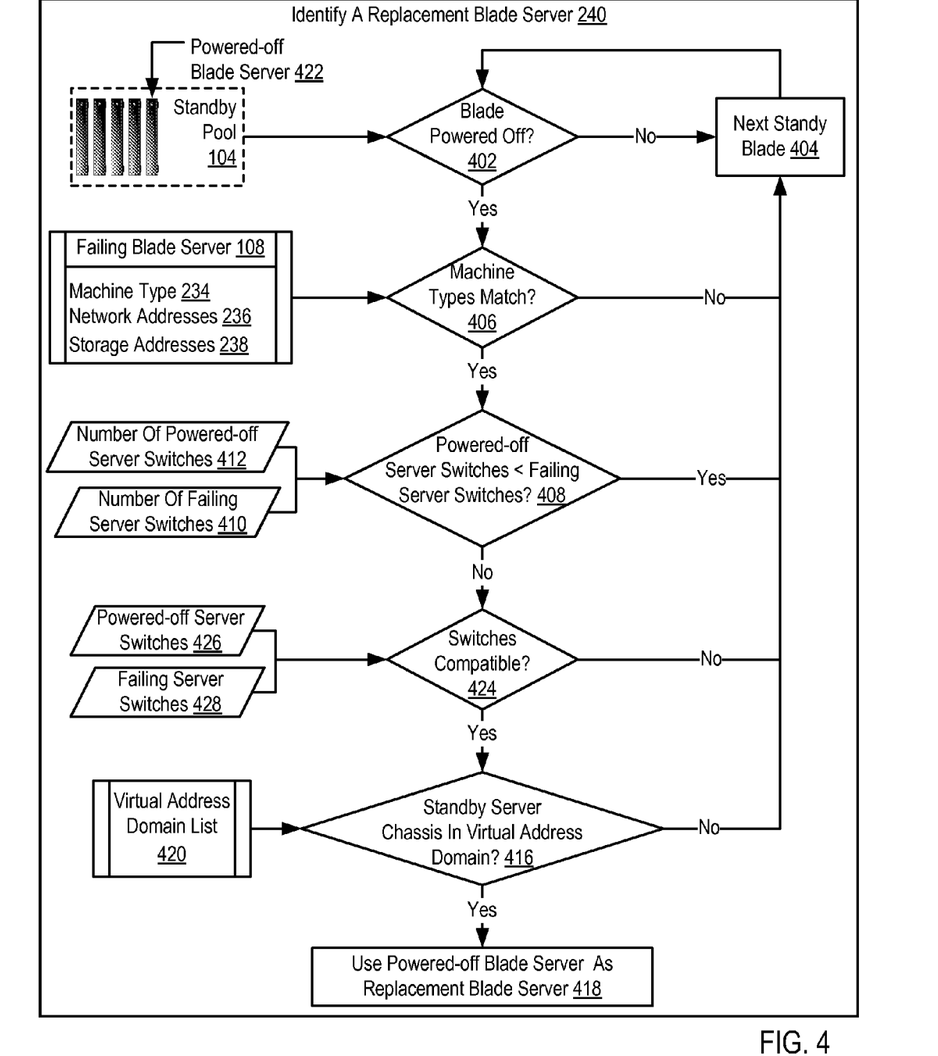
FIG. 4 sets forth a flow chart illustrating an exemplary method for identifying, by the system management server from a pool of standby blade servers, a replacement blade server according to embodiments of the present invention.

For further explanation, FIG. 4 sets forth a flow chart illustrating an exemplary method for identifying (240), by the system management server (152) from a pool (104) of standby blade servers, a replacement blade server (114) according to embodiments of the present invention. In the method of FIG. 4 identifying (240), by the system management server (152) from a pool (104) of standby blade servers, a replacement blade server (114) includes determining (402) whether a standby blade server (104) is powered off. The system management server (152) maintains a list of available standby blade servers, including various attributes of the standby blade servers, such as, for example, the servers' power status identifying whether they are powered on, their machine types, the number of switches in the chassis in which they are installed, and so on. Determining whether a standby blade server is powered off may, of course, be carried out by determining from the list of standby blade servers the power status of the blade server. As an alternative to determining the power status from the list of available standby blade servers, determining whether a standby blade server (104) is powered off may also be carried out with a call to a BSMM managing one of the servers in the list of standby servers. If the standby blade server is not powered off, the system management server continues in identifying (240) a replacement blade server by proceeding to the next (404) standby blade server in the pool (104).

If the standby blade server is powered off, the method of FIG. 4 continues by determining (406) whether the powered-off standby blade server (422) matches the machine type (234) of the failing blade server (108). Servers having different machine types may operate with different data communications protocols, software, or hardware and are therefore incompatible for complete failover. Determining whether the machine types match may include finding in the list of available standby blade servers for the machine type of the pow-ered-off blade server, the same machine type of the failing blade server. If the powered-off standby blade server (422) does not match the machine type (234) of the failing blade server (108), the system management server continues in identifying (240) a replacement blade server by proceeding to the next (404) standby blade server in the pool (104).

If the powered-off standby blade server (422) matches the machine type (234) of the failing blade server (108), the method of FIG. 4 continues by determining (406) whether a chassis in which the powered-off standby server (422) is installed includes a number (412) of switches not less than a number (412) of switches in a chassis in which the failing blade server (108) is installed. If the number of switches in the power-off blade server's chassis is less than the number of switches in the failing blade server's chassis, it may not be possible to connect the power-off blade server to each network and storage connection that the failing blade server is connected. That is, failover would not be complete. If the chassis in which the powered-off standby server (422) is installed includes a number (412) of switches less than a number (410) of switches in a chassis in which the failing blade server (108) is installed, the system management server continues in identifying (240) a replacement blade server by proceeding to the next (404) standby blade server in the pool (104).

If the chassis in which the powered-off standby server (422) is installed includes a number (412) of switches not less than a number (410) of switches in a chassis in which the failing blade server (108) is installed, the method of FIG. 4 continues by determining (424) whether the switches (426) in the chassis in which the powered-off standby blade server (422) is installed are compatible for failover with the switches (428) in the chassis in which the failing blade server (108) is installed. Switches comprising a plurality of ports for connecting blade servers in accordance with embodiments of the present invention often maintain port-specific parameters, various settings associated with a particular port. That is, particular ports of a switch are typically associated with parameters such as, for example, Quality of Service ('QoS') settings, Virtual Local Area Network ('VLAN') settings, N_Port ID Virtualization ('NPIV') parameters, and so on as will occur to those of skill in the art. During failover of a failing blade server connected at one or more ports of a switch to a replacement blade server connected at one or more ports to another switch, the port-specific parameters of the failing blade are migrated from the switch connecting the failing blade server to the switch connecting to the replacement blade server. If switches are compatible for failover, the switches are able to accept such port-specific parameters during failover. Switches of higher quality are typically capable of associating ports and parameters while lower quality switches are incapable of such association. Migrating port-specific parameters from a higher quality switch to a lower quality switch may, therefore, be impossible and the two switches are incompatible for failover. If the switches (426) in the chassis in which the powered-off standby blade server (422) is installed are not compatible for failover with the switches (428) in the chassis in which the failing blade server (108) is installed, the system management server continues in identifying (240) a replacement blade server by proceeding to the next (404) standby blade server in the pool (104).

If the switches (426) in the chassis in which the powered-off standby blade server (422) is installed are compatible for failover with the switches (428) in the chassis in which the failing blade server (108) is installed, the method of FIG. 4 continues by determining (416) whether the chassis in which the powered-off standby server (422) is installed is included in a virtual address domain that includes the chassis in which the failing blade server (108) is installed. A virtual address domain may be user defined and include virtual addresses that overlap the virtual addresses of another virtual address domain. That is, the virtual addresses of a virtual address domain may only be unique within that virtual address domain. If the powered-off blade server's chassis is included in a virtual domain having overlapping virtual addresses as that of the virtual address domain of the failing blade server's chassis, duplicate addresses of devices may exist between the virtual address domains causing, among other failures, data communications failures. If the chassis in which the powered-off standby server (422) is installed is not included in a virtual address domain that includes the chassis in which the failing blade server (108) is installed, the system management server continues in identifying (240) a replacement blade server by proceeding to the next (404) standby blade server in the pool (104). As mentioned above, when the replacement blade server is identified the system management server assigns the addresses of the failing blade server to the replacement blade server and powers on the replacement blade server.

Exemplary embodiments of the present invention are described largely in the context of a fully functional computer system for failover of blade servers in a data center. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of failover of blade servers in a data center, the method comprising:

powering off a failing blade server by a system management server through a blade server management module ('BSMM') managing the failing blade server, the failing blade server characterized by a machine type, one or more network addresses, and one or more storage addresses, the network addresses being virtual network addresses and the storage addresses being virtual storage addresses, wherein the virtual network addresses are different than original, manufacturer-provided network addresses of the blade server and the virtual storage addresses are different than the original, manufacturer-provided storage addresses of the blade server;

identifying, by the system management server from a pool of standby blade servers, a replacement blade server, the replacement blade server managed by a BSMM;

assigning, by the system management server through the BSMM managing the replacement blade server, the one or more network addresses and the one or more storage addresses of the failing blade server to the replacement blade server, including enabling in the replacement blade server the assigned addresses; and powering on the replacement blade server by the system management server through the BSMM managing the replacement blade server after the one or more network addresses and the one or more storage addresses of the failing blade server have been assigned to the replacement blade server.

2. The method of claim 1 further comprising:

clearing, by the system management server from the BSMM managing the failing blade server, an association of a slot number in which the failing blade server is installed and the assigned addresses; and disabling in the failing blade server the assigned addresses, including enabling the failing blade server's original addresses.

3. The method of claim 1 wherein identifying a replacement blade server further comprises:

determining whether a standby blade server is powered off;

if the standby blade server is powered off, determining whether the powered-off standby blade server matches the machine type of the failing blade server;

if the powered-off standby blade server matches the machine type of the failing blade server, determining whether a chassis in which the powered-off standby server is installed includes a number of switches not less than a number of switches in a chassis in which the failing blade server is installed;

if the chassis in which the powered-off standby server is installed includes a number of switches not less than a number of switches in a chassis in which the failing blade server is installed, determining whether the switches in the chassis in which the powered-off standby blade server is installed are compatible for failover with the switches in the chassis in which the failing blade server is installed; and if the switches in the chassis in which the powered-off standby blade server is installed are compatible for failover with the switches in the chassis in which the failing blade server is installed, determining whether the chassis in which the powered-off standby server is installed is included in a virtual address domain that includes the chassis in which the failing blade server is installed.

4. The method of claim 1 wherein assigning the one or more network addresses and the one or more storage addresses of the failing blade server to the replacement blade server further comprises:

associating in a configuration file of the BSMM managing the replacement blade server a slot number of the replacement blade server with the one or more network addresses and the one or more storage addresses of the failing blade server.

5. The method of claim 1 further comprising:
identifying a blade server as the failing blade server, including receiving from the BSMM managing the failing blade server an event notification, the event notification identifying a slot number of the failing blade server.

6. The method of claim 1, wherein enabling in the replacement blade server the assigned addresses further comprises:
setting in non-volatile memory of the replacement blade server the assigned addresses as the blade server's addresses instead of the blade server's manufacturer-provided addresses.

7. An apparatus for failover of blade servers in a data center, the apparatus comprising a computer processor, a computer memory operatively coupled to the computer processor, the computer memory having disposed within it computer program instructions that, when executed by the processor, cause the apparatus to carry out the steps of:
powering off a failing blade server by a system, management server through a blade server management module ('BSMM') managing the failing blade server, the failing blade server characterized by a machine type, one or more network addresses, and one or more storage addresses, the network addresses being virtual network addresses and the storage addresses being virtual storage addresses, wherein the virtual network addresses are different than original, manufacturer-provided network addresses of the blade server and the virtual storage addresses are different than the original, manufacturer-provided storage addresses of the blade server;
identifying, by the system management server from a pool of standby blade servers, a replacement blade server, the replacement blade server managed by a BSMM;
assigning, by the system management server through the BSMM managing the replacement blade server, the one or more network addresses and the one or more storage addresses of the failing blade server to the replacement blade server, including enabling in the replacement blade server the assigned addresses; and
powering on the replacement blade server by the system management server through the BSMM managing the replacement blade server after the one or more network addresses and the one or more storage addresses of the failing blade server have been assigned to the replacement blade server.

8. The apparatus of claim 7 further comprising computer program instructions that, when executed by the processor, cause the apparatus to carry out the steps clearing, by the system management server from the BSMM managing the failing blade server, an association of a slot number in which the failing blade server is installed and the assigned addresses; and
disabling in the failing blade server the assigned addresses, including enabling the failing blade server's original addresses.

9. The apparatus of claim 7 wherein identifying a replacement blade server further comprises:
determining whether a standby blade server is powered off;
if the standby blade server is powered off, determining whether the powered-off standby blade server matches the machine type of the failing blade server;
if the powered-off standby blade server matches the machine type of the failing blade server, determining whether a chassis in which the powered-off standby server is installed includes a number of switches not less than a number of switches in a chassis in which the failing blade server is installed;
if the chassis in which the powered-off standby server is installed includes a number of switches not less than a number of switches in a chassis in which the failing blade server is installed, determining whether the switches in the chassis in which the powered-off standby blade server is installed are compatible for failover with the switches in the chassis in which the failing blade server is installed; and
if the switches in the chassis in which the powered-off standby blade server is installed are compatible for failover with the switches in the chassis in which the failing blade server is installed, determining whether the chassis in which the powered-off standby server is installed is included in a virtual address domain that includes the chassis in which the failing blade server is installed.

10. The apparatus of claim 7 wherein assigning the one or more network addresses and the one or more storage addresses of the failing blade server to the replacement blade server further comprises:
associating in a configuration file of the BSMM managing the replacement blade server a slot number of the replacement blade server with the one or more network addresses and the one or more storage addresses of the failing blade server.

11. The apparatus of claim 7 further comprising computer program instructions that, when executed by the processor, cause the apparatus to carry out the steps of:
identifying a blade server as the failing blade server, including receiving from the BSMM managing the failing blade server an event notification, the event notification identifying a slot number of the failing blade server.

12. The apparatus of claim 7 wherein enabling in the replacement blade server the assigned addresses further comprises:
setting in non-volatile memory of the replacement blade server the assigned addresses as the blade server's addresses instead of the blade server's manufacturer-provided addresses.

13. A computer program product for failover of blade servers in a data center, the computer program product disposed in a computer readable recordable medium, the computer program product comprising computer program instructions that, when executed by a computer processor, cause the computer processor to carry out the steps of:
powering off a failing blade server by a system management server through a, blade server management module ('BSMM') managing the failing blade server, the failing blade server characterized by a machine type, one or more network addresses, and one or more storage addresses, the network addresses being virtual network addresses and the storage addresses being virtual storage addresses wherein the virtual network addresses are different than original, manufacturer-provided network addresses of the blade server and the virtual storage addresses are different than the original, manufacturer-provided storage addresses of the blade server;
identifying, by the system management server from a pool of standby blade servers, a replacement blade server, the replacement blade server managed by a BSMM;
assigning, by the system management server through the BSMM managing the replacement blade server, the one or more network addresses and the one or more storage addresses of the failing blade server to the replacement blade server, including enabling in the replacement blade server the assigned addresses; and powering on the replacement blade server by the system management server through the BSMM managing the replacement blade server after the one or more network addresses and the one or more storage addresses of the failing blade server have been assigned to the replacement blade server.

14. The computer program product of claim 13 further comprising computer program instructions that, when executed by a computer processor, cause the computer processor to carry out the steps of:
   clearing, by the system management server from the BSMM managing the failing blade server, an association of a slot number in which the failing blade server is installed and the assigned addresses; and
   disabling in the failing blade server the assigned addresses, including enabling the failing blade server's original addresses.

15. The computer program product of claim 13 wherein identifying a replacement blade server further comprises:
   determining whether a standby blade server is powered off;
   if the standby blade server is powered off, determining whether the powered-off standby blade server matches the machine type of the failing blade server;
   if the powered-off standby blade server, matches the machine type of the failing blade server, determining whether a chassis in which the powered-off standby server is installed includes a number of switches not less than a number of switches in a chassis in which the failing blade server is installed;
   if the chassis in which the powered-off standby server is installed includes a number of switches not less than a number of switches in a chassis in which the failing blade server is installed, determining whether the switches in the chassis in which the powered-off standby blade server is installed are compatible for failover with the switches in the chassis in which the failing blade server is installed; and
   if the switches in the chassis in which the powered-off standby blade server is installed are compatible for failover with the switches in the chassis in which the failing blade server is installed, determining whether the chassis in which, the powered-off standby server is installed is included in a virtual address domain that includes the chassis in which the failing blade server is installed.

16. The computer program product of claim 13 wherein assigning the one or more network addresses and the one or more storage addresses of the failing blade server to the replacement blade server further comprises:
   associating in a configuration file of the BSMM managing the replacement blade server a slot number of the replacement blade server with the one or more network addresses and, the one or more storage addresses of the failing blade server.

17. The computer program product of claim 13 further comprising computer program instructions that, when executed by a computer processor, cause the computer processor to carry out the steps of
   identifying a blade server as the failing blade server, including receiving from the BSMM managing the failing blade server an event notification, the event notification identifying a slot number of the failing blade server.

18. The computer program product of claim 13 wherein enabling in the replacement blade server the assigned addresses further comprises:
   setting in non-volatile memory of the replacement blade server the assigned addresses as the blade server's addresses instead of the blade server's manufacturer-provided addresses.

\* \* \* \* \*